(12) United States Patent
Suh et al.

(10) Patent No.: US 8,603,356 B2
(45) Date of Patent: Dec. 10, 2013

(54) WHOLLY AROMATIC LIQUID CRYSTALLINE POLYESTER RESIN COMPOUND WITH ENHANCED FLUIDITY AND METHOD OF PREPARING THE SAME

(75) Inventors: Sang Hyuk Suh, Daejeon (KR); Youn Eung Lee, Daejeon (KR); Young Hak Shin, Daejeon (KR); Jin Kyu Lee, Busan (KR); Mahn Jong Kim, Daejeon (KR)

(73) Assignee: Samsung Fine Chemicals Co., Ltd., Ulsan (KR)

( * ) Notice: Subject to any disclaimer, the term of this patent is extended or adjusted under 35 U.S.C. 154(b) by 81 days.

(21) Appl. No.: 13/260,213

(22) PCT Filed: Apr. 2, 2010

(86) PCT No.: PCT/KR2010/002034
§ 371 (c)(1),
(2), (4) Date: Sep. 23, 2011

(87) PCT Pub. No.: WO2010/117164
PCT Pub. Date: Oct. 14, 2010

(65) Prior Publication Data
US 2012/0022202 A1    Jan. 26, 2012

(30) Foreign Application Priority Data
Apr. 6, 2009  (KR) .................. 10-2009-0029486

(51) Int. Cl.
C09K 19/52 (2006.01)
C09K 19/54 (2006.01)
C09K 19/20 (2006.01)
C08L 67/03 (2006.01)

(52) U.S. Cl.
USPC ............ 252/299.01; 252/299.5; 252/299.67

(58) Field of Classification Search
USPC ........ 252/299.01, 299.5; 524/425, 445, 449, 524/451
See application file for complete search history.

(56) References Cited

U.S. PATENT DOCUMENTS

| | | | |
|---|---|---|---|
| 5,147,967 A | | 9/1992 | Stern et al. |
| 5,352,746 A | | 10/1994 | Asai et al. |
| 2003/0008979 A1 | * | 1/2003 | Suenaga et al. ............... 525/410 |
| 2009/0111926 A1 | * | 4/2009 | Yonezawa et al. ............ 524/405 |
| 2009/0212451 A1 | * | 8/2009 | Kim et al. ......................... 264/6 |
| 2012/0199790 A1 | * | 8/2012 | Yun et al. .................. 252/299.5 |

FOREIGN PATENT DOCUMENTS

| | | |
|---|---|---|
| CN | 1662602 A | 8/2005 |
| CN | 101321803 A | 12/2008 |
| EP | 0396955 A2 | 11/1990 |
| EP | 0594845 A1 | 5/1994 |
| GB | 2158832 A | 11/1985 |
| JP | 2002-249647 A | 9/2002 |
| JP | 2003-313403 | 6/2003 |
| KR | 10-1996-0011007 B1 | 8/1996 |
| KR | 10-0722949 B1 | 5/2007 |
| KR | 10-0773646 B1 | 11/2007 |
| WO | 04/000937 A1 | 12/2003 |
| WO | WO 2007052955 A1 * | 5/2007 |

OTHER PUBLICATIONS

International Search Report, PCT/KR2010/002034, dated Nov. 19, 2010.
Written Opinion of he International Searching Authority, PCT/KR2010/002034, dated Nov. 19, 2010.
Chinese Office Action in Chinese Application No. 201080015782.6, mailed on Mar. 13, 2013.
Extended Search Report for European Patent Application No. 10761825.8, mailed on Sep. 9, 2013.
Office Action for Japanese Patent Application No. 2012-503338, mailed on Aug. 27, 2013.
with English Office Action in Japanese Patent Application No. 2012-503338, dated Aug. 27, 2013, with English Translation.

* cited by examiner

*Primary Examiner* — Shean C Wu
(74) *Attorney, Agent, or Firm* — Nixon Peabody LLP

(57) ABSTRACT

Provided are a wholly aromatic liquid crystalline polyester resin compound and a method of preparing the same. The wholly aromatic liquid crystalline polyester resin compound comprises a first wholly aromatic liquid crystalline polyester resin with a low melting point, a second wholly aromatic liquid crystalline polyester resin with a high melting point, and an additive, wherein the amount of the first wholly aromatic liquid crystalline polyester resin is 5 to 10 parts by weight with respect to 100 parts by weight of the second wholly aromatic liquid crystalline polyester resin.

3 Claims, No Drawings

WHOLLY AROMATIC LIQUID CRYSTALLINE POLYESTER RESIN COMPOUND WITH ENHANCED FLUIDITY AND METHOD OF PREPARING THE SAME

CROSS REFERENCE TO RELATED APPLICATIONS or PRIORITY CLAIM

This application is a national phase of International Application No. PCT/KR2010/002034, which was filed on Apr. 2, 2010, and which claims priority of Korean Patent Application No. 10-2009-0029486, filed on Apr. 6, 2009, in the Korean Intellectual Property Office, the disclosure of which is incorporated herein in its entirety by reference.

TECHNICAL FIELD

One or more aspects of the present invention relate to wholly aromatic liquid crystalline polyester resin compounds and methods of preparing the same, and more particularly, to a wholly aromatic liquid crystalline polyester resin compound including two or more kinds of wholly aromatic liquid crystalline polyester resins with different melting points, and an additive, and a method of preparing the same.

BACKGROUND ART

Wholly aromatic liquid crystalline polyester resins have good physical properties of heat resistance, dimensional stability, and fluidity when being melted, and thus are widely used around the world, mainly in the electronic parts industry, as materials for fine injection molding. Particularly, due to excellent dimensional stability and electricity insulation performance, their usage has been expanding into films for electronic materials and materials for substrates.

A wholly aromatic liquid crystalline polyester resin compound used as materials of fine injection molding requires good fluidity for producing a compact and lightweight product. To obtain the wholly aromatic liquid crystalline polyester resin compound with such good fluidity, a wholly aromatic liquid crystalline polyester resin with a low melting point has to be used to manufacture the wholly aromatic liquid crystalline polyester resin compound. However, usage of the wholly aromatic liquid crystalline polyester resin with a low melting point in preparing the wholly aromatic liquid crystalline polyester resin compound causes a problem of degrading the heat resistance of the wholly aromatic liquid crystalline polyester resin compound.

DISCLOSURE OF THE INVENTION

Technical Problem

When a wholly aromatic liquid crystalline polyester resin with a low melting point is used to manufacture the wholly aromatic liquid crystalline polyester resin compound, usage of the wholly aromatic liquid crystalline polyester resin with a low melting point in preparing the wholly aromatic liquid crystalline polyester resin compound causes a problem of degrading the heat resistance of the wholly aromatic liquid crystalline polyester resin compound.

Technical Solution

An embodiment of the present invention provides a wholly aromatic liquid crystalline polyester resin compound including two or more kinds of wholly aromatic liquid crystalline polyester resins with different melting points, and an additive.

Another embodiment of the present invention provides a method of preparing the wholly aromatic liquid crystalline polyester resin compound.

According to an aspect of the present invention, a wholly aromatic liquid crystalline polyester resin compound includes a first wholly aromatic liquid crystalline polyester resin with a low melting point, a second wholly aromatic liquid crystalline polyester resin with a high melting point, and an additive, wherein the amount of the first wholly aromatic liquid crystalline polyester resin is 5 to 10 parts by weight with respect to 100 parts by weight of the second wholly aromatic liquid crystalline polyester resin.

Melting points of the first and second wholly aromatic liquid crystalline polyester resins may be 310 to 320° C. and 360 to 375° C.

The additive may include at least one of an inorganic filler and an organic filler.

The inorganic filler may include glass fiber, talc, calcium carbonate, mica, clay, or a mixture of two or more of them and the organic filler includes carbon fiber.

According to another aspect of the present invention, a method of preparing a wholly aromatic liquid crystalline polyester resin compound includes mixing a first wholly aromatic liquid crystalline polyester resin with a low melting point, a second wholly aromatic liquid crystalline polyester resin with a high melting point, and an additive, and melt-kneading them, wherein the amount of the first wholly aromatic liquid crystalline polyester resin is 5 to 10 parts by weight with respect to 100 parts by weight of the second wholly aromatic liquid crystalline polyester resin.

Advantageous Effects

A wholly aromatic liquid crystalline polyester resin compound with enhanced fluidity and a method of preparing the same can be obtained by using two or more kinds of wholly aromatic liquid crystalline polyester resins with different melting points, according to an embodiment of the present invention.

MODE FOR INVENTION

A wholly aromatic liquid crystalline polyester resin compound and a method of preparing the same will now be described in detail according to an embodiment of the present invention.

According to an embodiment of the present invention, a wholly aromatic liquid crystalline polyester resin compound includes a first wholly aromatic liquid crystalline polyester resin with a low melting point, a second wholly aromatic liquid crystalline polyester resin with a high melting point, and an additive, wherein the amount of the first wholly aromatic liquid crystalline polyester resin is 5 to 10 parts by weight with respect to 100 parts by weight of the second wholly aromatic liquid crystalline polyester resin. If the amount of the first wholly aromatic liquid crystalline polyester resin is 5 parts by weight or more with respect to 100 parts by weight of the second wholly aromatic liquid crystalline polyester resin, improvement in fluidity in a final product of the wholly aromatic liquid crystalline polyester resin compound may be remarkably high, and if the amount of the first wholly aromatic liquid crystalline polyester resin is 10 parts by weight or less with respect to 100 parts by weight of the second wholly aromatic liquid crystalline polyester resin, the possibility of degrading the heat resistance in the final product of the wholly aromatic liquid crystalline polyester resin compound may be reduced.

Melting points of the first and second wholly aromatic liquid crystalline polyester resins may be 310 to 320° C. and 360 to 375° C., respectively. If the melting point of the first wholly aromatic liquid crystalline polyester resin is 310° C. or higher, the possibility of degrading the heat resistance in the final product of the wholly aromatic liquid crystalline polyester resin compound may be less and blisters may not be caused in the wholly aromatic liquid crystalline polyester resin compound, and if the melting point of the first wholly aromatic liquid crystalline polyester resin is 320° C. or less, the enhancement in fluidity may be significantly high. In addition, If the melting point of the second wholly aromatic liquid crystalline polyester resin is 360° C. or higher, the possibility of degrading the heat resistance in the final product of the wholly aromatic liquid crystalline polyester resin compound may be less, and if the melting point of the second wholly aromatic liquid crystalline polyester resin is 375° C. or less, the enhancement in fluidity may be high, thus making injection molding easier.

The two or more kinds of wholly aromatic liquid crystalline polyester resins with different melting points for use in preparing the wholly aromatic liquid crystalline polyester resin compound may be prepared by undergoing steps as follows:

(a) synthesizing a wholly aromatic liquid crystalline polyester prepolymer by condensation polymerization of at least two monomers; and (b) synthesizing a wholly aromatic liquid crystalline polyester resin by solid state polycondensation of the prepolymer.

The monomers used in the step (a) include at least one kind of compound selected from the group consisting of aromatic diol, aromatic diamine, and aromatic hydroxylamine; and aromatic dicarboxylic acid. The monomers may further include aromatic hydroxycarboxylic acid and/or aromatic amino carboxylic acid.

For step (a), solution condensation polymerization or bulk condensation polymerization may be used. In addition, monomers (i.e., acylated monomers) that have been pretreated with a chemical compound, such as, an acylation agent, particularly, an acetylating agent, and thus, have improved reactivity, may be used to facilitate the condensation polymerization of step (a).

a. For the solid state polycondensation of step (b), proper heat needs to be applied to the prepolymer, and some heat applying methods include a method of using a hot plate, a method of using hot-air, a method of using high-temperature fluid. By-products produced during the solid state polycondensation may be removed by purging with inert gas or by vacuuming.

The wholly aromatic liquid crystalline polyester resins include various repeating units in a chain thereof. For example, the repeating units are as follows:

(1) Repeating unit derived from an aromatic diol:

—O—Ar—O—

(2) Repeating unit derived from an aromatic diamine;

—HN—Ar—NH—

(3) Repeating unit derived from an aromatic hydroxyl amine;

—HN—Ar—O—

(4) Repeating unit derived from an aromatic dicarboxylic acid

—OC—Ar—CO—

(5) A repeating unit derived from an aromatic hydroxycarboxylic acid

—O—Ar—CO—

(6) A repeating unit derived from an aromatic amino carboxylic acid

—HN—Ar—CO—

In the formulae defined above, Ar may be phenylene, biphenylene, naphthalene, an aromatic compound in which two phenylene are bonded to each other via a carbon or non-carbon element, or an aromatic compound selected from the group consisting of phenylene, biphenylene, naphthalene, or two phenylene bonded to each other by carbon or a non-carbon element in which at least one hydrogen atom is substituted with other elements.

The additive may include inorganic and/or organic fillers. The inorganic filler may include glass fiber, talc, calcium carbonate, mica, clay, or a compound of two or more of them, and the organic filler may include carbon fiber. The inorganic or organic fillers may play a role in improving the mechanical strength of a product obtained by injection molding.

The wholly aromatic liquid crystalline polyester resin compound may be prepared by mixing two kinds of wholly aromatic liquid crystalline polyester resins with different melting points and an additive in a predetermined ratio (i.e., adjusting the amount of a first wholly aromatic liquid crystalline polyester resin into 5 to 10 parts by weight with respect to 100 parts by weight of a second wholly aromatic liquid crystalline polyester resin) and melt-kneading them. A batch type mixer, a twin screw extruder, or a mixing-roll may be used for such melt-kneading. In addition, a lubricant may be used during the melt-kneading for smooth melt-keading.

Reference will now be made in detail to embodiments to describe the invention. In this regard, the present embodiments may have different forms and should not be construed as being limited to the descriptions set forth herein.

Example 1

(1) Selection of Wholly Aromatic Liquid Crystalline Polyester Resins

A KF grade wholly aromatic polyester resin provided by Samsung Fine Chemicals Co., Ltd. was used as a wholly aromatic liquid crystalline polyester resin with a low melting point. Using Differential Scanning calorimetry (DSC), the melting point of the resin was measured to be 315° C. A KB grade wholly aromatic polyester resin provided by Samsung Fine Chemicals Co., Ltd. was used as a wholly aromatic liquid crystalline polyester resin with a high melting point. Using the DSC, the melting point of the wholly aromatic liquid crystalline polyester resin was measured to be 363° C.

(2) Preparation of a Wholly Aromatic Liquid Crystalline Polyester Resin Compound A wholly aromatic liquid crystalline polyester resin compound was prepared by mixing the two kinds of wholly aromatic liquid crystalline polyester resins having different melting points and a glass fiber (e.g., a ground glass fiber with 10 μm in diameter and 150 μm in average length) in the weight ratio 6:4 (i.e., resins: glass fiber) and melt-kneading them with a twin screw extruder (with 40 in L/D and 25 mm in diameter). In this case, inputs of the KF grade wholly aromatic liquid crystalline polyester resin with a low melting point and the KB grade wholly aromatic liquid crystalline polyester resin with a high melting point were adjusted to 3 and 57 parts by weight, respectively, with respect to 100 parts by weight of the final wholly aromatic liquid crystalline polyester resin compound. During the preparation of the wholly aromatic liquid crystalline polyester resin compound, by-products were removed by the twin screw extruder under vacuum.

Example 2

The same method as in Example 1 was applied to prepare the wholly aromatic liquid crystalline polyester resin compound except that inputs of the KF grade wholly aromatic liquid crystalline polyester resin with a low melting point and the KB grade wholly aromatic liquid crystalline polyester resin with a high melting point were adjusted to 5 and 55 parts by weight, respectively, with respect to 100 parts by weight of the final wholly aromatic liquid crystalline polyester resin compound.

Comparative Example 1

The same method as in Example 1 was applied to prepare the wholly aromatic liquid crystalline polyester resin compound except that an input of the KB grade wholly aromatic liquid crystalline polyester resin with a high melting point was adjusted to 60 parts by weight with respect to 100 parts by weight of the final wholly aromatic liquid crystalline polyester resin compound, without using the KF grade wholly aromatic liquid crystalline polyester resin with a low melting point at all.

Comparative Example 2

The same method as in Example 1 was applied to prepare the wholly aromatic liquid crystalline polyester resin compound except that inputs of the KF grade wholly aromatic liquid crystalline polyester resin with a low melting point and the KB grade wholly aromatic liquid crystalline polyester resin with a high melting point were adjusted to 1 and 59 parts by weight, respectively, with respect to 100 parts by weight of the final wholly aromatic liquid crystalline polyester resin compound.

Comparative Example 3

The same method as in Example 1 was applied to prepare the wholly aromatic liquid crystalline polyester resin compound except that inputs of the KF grade wholly aromatic liquid crystalline polyester resin with a low melting point and the KB grade wholly aromatic liquid crystalline polyester resin with a high melting point were adjusted to 7 and 53 parts by weight, respectively, with respect to 100 parts by weight of the final wholly aromatic liquid crystalline polyester resin compound.

Evaluation Example 1

Fluidity Measurement

In order to measure fluidity of the wholly aromatic liquid crystalline polyester resin compounds resulting from Examples 1 and 2 and Comparative Examples 1 to 3, a capillary viscometer was used to measure a respective melt viscosity of the wholly aromatic liquid crystalline polyester resin compounds at a temperature of 380° C. and a shear rate of 1000/s. The melt viscosities of the wholly aromatic liquid crystalline polyester resin compounds are shown in Table 1 below. Low melt viscosity means high fluidity.

(Heat Resistance Measurement)

Injection molded test specimens were manufactured from the wholly aromatic liquid crystalline polyester resin compounds resulting from Examples 1 and 2 and Comparative Examples 1 to 3, and heat resistance of the respective test specimens was evaluated. A form of the test specimens and a measurement scheme of heat resistance was set based on ASTM D648 and the applied pressure was 18.5 kgf/cm$^2$.

TABLE 1

| Classification | Example 1 | Example 2 | Comparative Example 1 | Comparative Example 2 | Comparative Example 3 |
|---|---|---|---|---|---|
| Fluidity (poise) | 464 | 257 | 1425 | 1217 | 173 |
| Heat Resistance (° C.) | 319 | 318 | 319 | 319 | 309 |

Referring to Table 1, both fluidity and heat resistance of the wholly aromatic liquid crystalline polyester resin compounds resulting from Examples 1 and 2 were found to be good. On the other hand, either fluidity or heat resistance of the wholly aromatic liquid crystalline polyester resin compounds resulting from Comparative Examples 1 to 3, was found to be too low. In conclusion, the wholly aromatic liquid crystalline polyester resin compounds according to an embodiment of the present invention may be valuably used as materials for fine injection molding.

It should be understood that the exemplary embodiments described therein should be considered in a descriptive sense only and not for purposes of limitation. Descriptions of features or aspects within each embodiment should typically be considered as available for other similar features or aspects in other embodiments.

The invention claimed is:
1. A wholly aromatic liquid crystalline polyester resin compound comprising,
   a first wholly aromatic liquid crystalline polyester resin with a low melting point,
   a second wholly aromatic liquid crystalline polyester resin with a high melting point, and
   an additive,
   wherein the amount of the first wholly aromatic liquid crystalline polyester resin is 5 to less than 10 parts by weight with respect to 100 parts by weight of the second wholly aromatic liquid crystalline polyester resin,
   wherein melting points of the first and second wholly aromatic liquid crystalline polyester resins are 310 to 320° C. and 360 to 375° C.
2. The wholly aromatic liquid crystalline polyester resin compound of claim 1, wherein the additive includes at least one of an inorganic filler and an organic filler.
3. The wholly aromatic liquid crystalline polyester resin compound of claim 2, wherein the inorganic filler includes glass fiber, talc, calcium carbonate, mica, clay, or a mixture of two or more of them and the organic filler includes carbon fiber.

* * * * *

UNITED STATES PATENT AND TRADEMARK OFFICE
CERTIFICATE OF CORRECTION

PATENT NO. : 8,603,356 B2  Page 1 of 1
APPLICATION NO. : 13/260213
DATED : December 10, 2013
INVENTOR(S) : Suh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 90 days.

Signed and Sealed this

Twenty-second Day of September, 2015

Michelle K. Lee
*Director of the United States Patent and Trademark Office*